Figure 1:
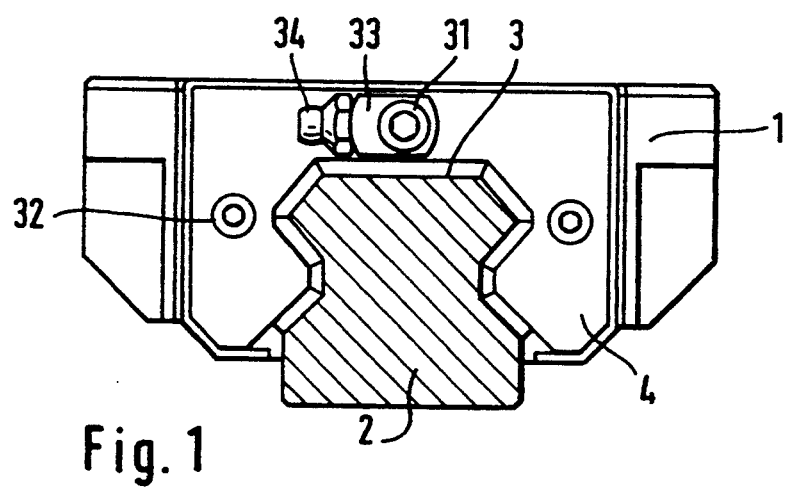

United States Patent [19]
Winkelmann et al.

[11] Patent Number: 5,399,023
[45] Date of Patent: Mar. 21, 1995

[54] WIPER UNIT FOR A BEARING COMPONENT

[75] Inventors: Ludwig Winkelmann; Hartmut Koschmieder, both of Erlangen; Steffen Kotzsch, Langenzenn, all of Germany

[73] Assignee: Ina Walzlager Schaeffler KG, Germany

[21] Appl. No.: 244,734

[22] PCT Filed: Nov. 26, 1992

[86] PCT No.: PCT/EP92/02725
§ 371 Date: Jun. 9, 1994
§ 102(e) Date: Jun. 9, 1994

[87] PCT Pub. No.: WO93/12351
PCT Pub. Date: Jun. 24, 1993

[30] Foreign Application Priority Data
Dec. 12, 1991 [DE] Germany .................. 41 41 038.6

[51] Int. Cl.⁶ .............................................. F16C 29/06
[52] U.S. Cl. .......................................... 384/13; 384/15; 384/45
[58] Field of Search .................. 384/13, 15, 45, 44, 384/43; 464/168

[56] References Cited

U.S. PATENT DOCUMENTS

| | | | |
|---|---|---|---|
| 5,139,347 | 8/1992 | Hattori | 384/15 |
| 5,267,796 | 12/1993 | Nonaka et al. | 384/13 |
| 5,340,219 | 8/1994 | Agari | 384/15 |

FOREIGN PATENT DOCUMENTS

| | | |
|---|---|---|
| 0211243 | 7/1986 | European Pat. Off. |
| 0512253 | 11/1992 | European Pat. Off. |
| 2522092 | 8/1983 | France |
| 2130420 | 6/1982 | Germany |

*Primary Examiner*—Lenard A. Footland
*Attorney, Agent, or Firm*—Bierman and Muserlian

[57] ABSTRACT

The invention concerns a wiper unit for a bearing component, preferably a linear rolling bearing component, mounted on a raceway of a guide rail and comprising at each front end, a wiper retained by a carrier plate, the wiper being provided with lubricant canals for supplying lubricant to the bearing component, and an end region of the wiper resting on the raceway to retain lubricant in the bearing component.

10 Claims, 4 Drawing Sheets

Fig. 7
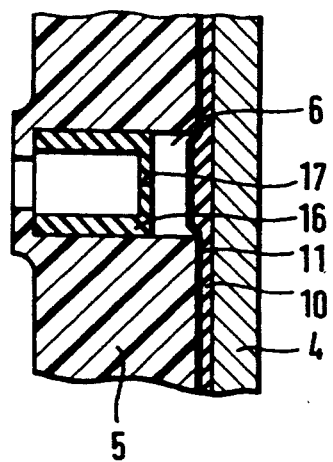
Fig. 8
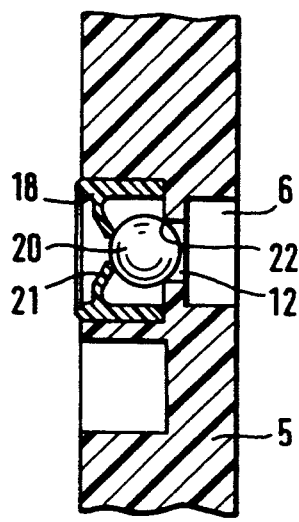
Fig. 9
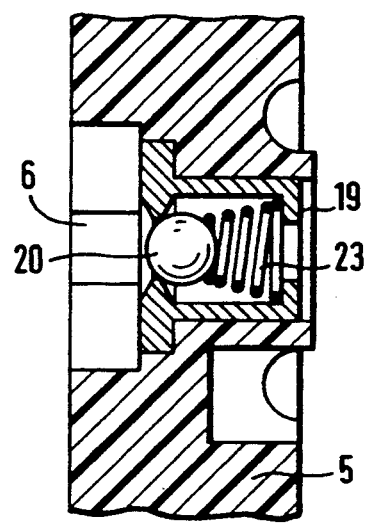
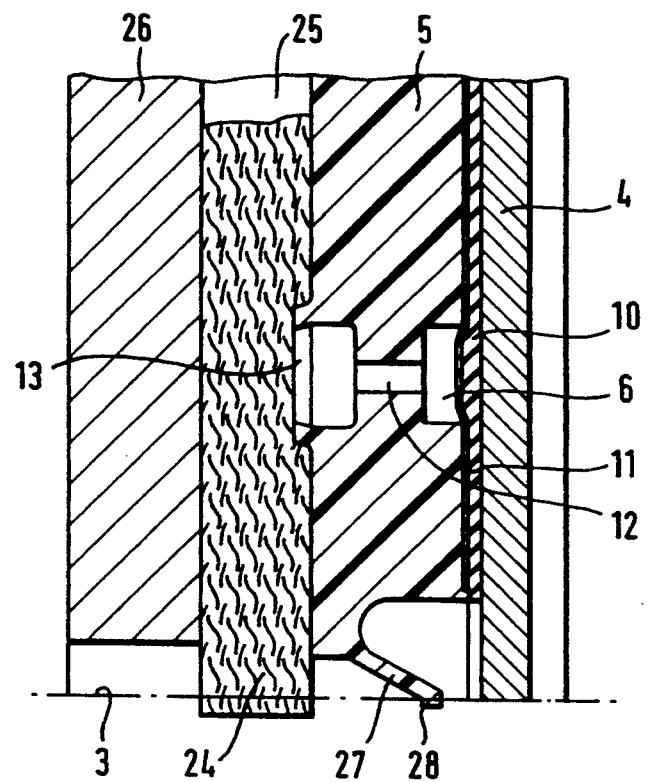
Fig. 10

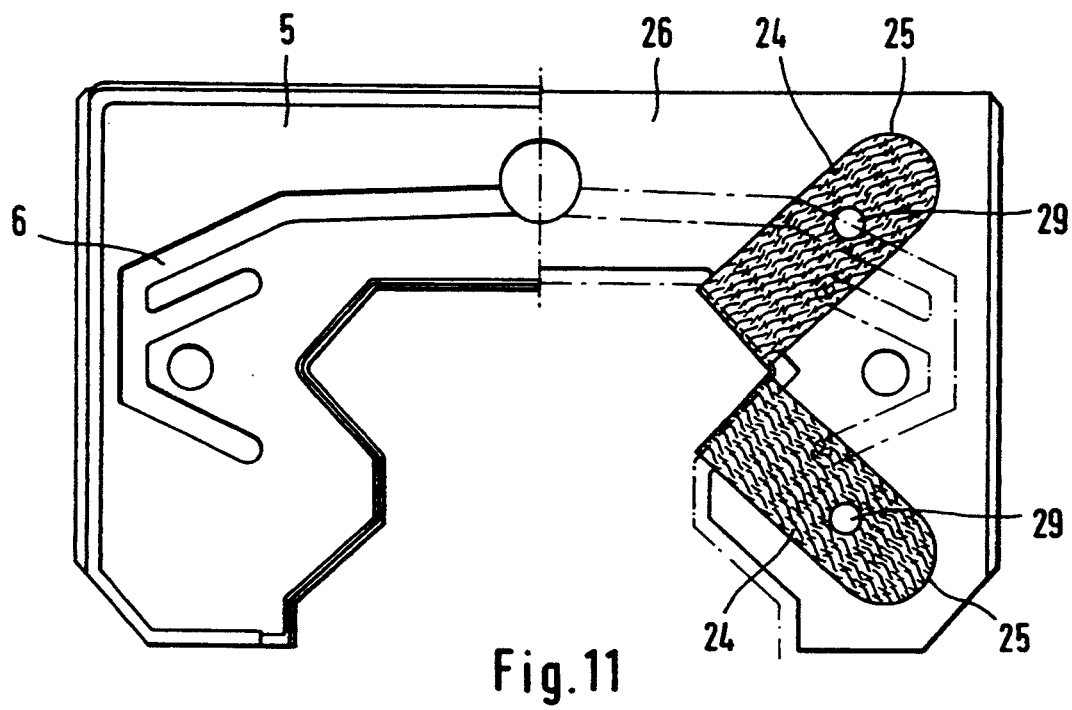
Fig.11
Fig.12
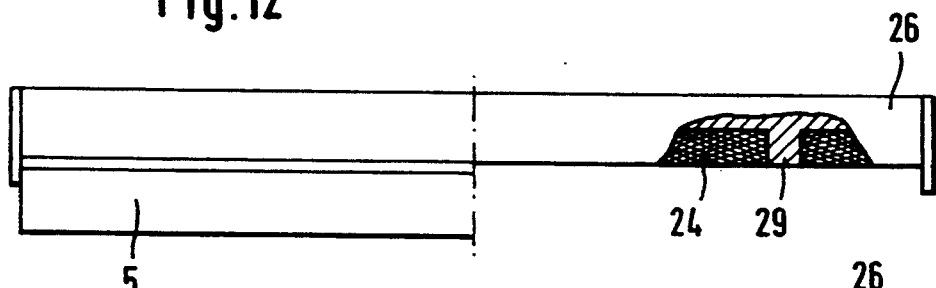
Fig.13
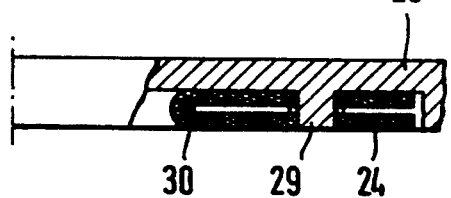
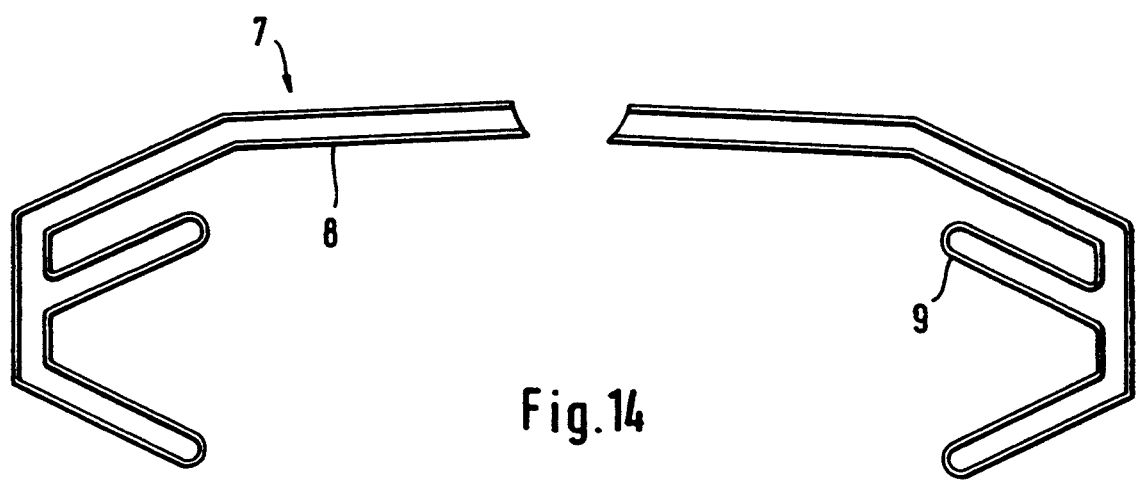
Fig.14

WIPER UNIT FOR A BEARING COMPONENT

The invention concerns a wiper unit for a bearing component, preferably a linear rolling bearing component, mounted on a raceway of a guide rail and comprising at each front end, a wiper retained by a carrier plate, the wiper being provided with lubricant canals for supplying lubricant to the bearing component:, and an end region of the wiper resting-on the raceway to retain lubricant in the bearing component.

From DE-PS 21 30 420, a wiper unit for a bearing component is known which permits a constantly dosed lubrication of a rolling bearing by simple and inexpensive means. This unit comprises a wiper of polymeric material having a wiping edge intended to clean the raceway during the reciprocating motion of a bearing component in the form of a recirculating roller shoe to keep impurities away from the rolling bearing and simultaneously prevent the escape of lubricant therefrom. Lubricant is transferred into the interior of the bearing component from the outside by means of an element made of an absorbent material which surrounds the wiper edge resting on the raceway. With this construction, it is possible that undesired emulsions which may be present on the raceway are transported together with the lubricant into the bearing.

The object of the invention is to provide a wiper unit permitting the supply of fresh lubricant, without leakage losses, directly to the bearing component while distributing the lubricant uniformly and assuring that, as far as possible, the entire lubricant remains in the bearing component during the reciprocating motion thereof so that the amount of lubricant required for re-lubrication is drastically reduced. In this way, users of equipment having such wiper units should be able to better meet enviromental requirements imposed by law. It is further intended to prevent lubricant; losses by leakage occurring between the wiper and the carrier plate due to unevennesses on the wiper contact surface.

According to a first proposition of the invention, this object is achieved by the fact that the lubricant canals are configured as grooves starting from an end Face of the wiper, there being arranged between the carrier plate and the wiper an elastic sealing layer provided with a tear-resistant foil which seals the lubricant canals. This elastic sealing layer levels out the unevennesses of the wiper end face and the foil prevents a too strong penetration of the sealing layer into the lubricant canals. The sealing layer can be made, for example, of a cellular material with a glued-on tear-resistant foil.

The wiper can be provided with connecting canals and transfer openings by which the lubricant canals arranged on the outer end face of the wiper can be connected with the inner end face thereof facing the bearing component. It is possible at the same time to insert a body of permeable cellular material into the transfer opening or the lubricant canal to extend through the entire free cross-section (clear width) thereof. In such a body made of open-cell cellular material which is inserted with slight pre-tension, the capillary effect in the lubricant-filled cells of the cellular material prevents the passage of small air bubbles and thus also a sinking of the liquid lubricant. In this way, a flowing-back of lubricant from parts of the lubricant canal situated at a higher level is prevented so that these parts of the canal do not need to be refilled after every new lubricating pulse. If the cellular material is removed from the transfer openings or the lubricant canals, as the case may be, the wiper can also be used for grease lubrication. Thus it is suitable not only for oil lubrication.

The transfer opening can be closed by an inserted valve of a material with rubber-like elasticity and having a widenable opening slit. It is also possible to close the transfer opening in one of the two directions of flow by means of an inserted non-return valve. Such insertable valve elements enable the wiper to be used both for oil and grease lubrication and they assure at the same time that air ingress into the lubricant canals is avoided. These valve elements can be separate elements inserted into the transfer opening, or the wiper itself can be configured so that the valve ball of a non-return valve is pressed directly by spring elements against a sealing edge formed on the wiper to serve as a valve seat. The spring elements for pressing the valve ball can be formed either directly on the wiper or on the valve body which is inserted into the transfer opening, or they can be inserted in the form of separate spring elements. In the case of a valve made of a material with rubber-like elasticity and having an opening slit, the lubricant fed under pressure presses the slit apart thus allowing the passage of lubricant. On a reduction of the lubricant pressure, the elasticity of the rubber-like elastic valve body causes the slit to spring back and close thus also closing the lubricant canal.

A further possibility of reducing lubricant requirement consists in arranging a strip of wick on the inner end face of the wiper facing the bearing component so that an end region of the wick strip extends upto the raceway of the guide rail. Such a wick strip can be made, for example, of an open-cell cellular material, of felt, or woven or formed fabrics so that lubricant is transferred by it by capillar action directly to the raceway. The wick strip can be retained by a retainer plate and be inserted into a recess thereof. Far securing the wick strip, projecting retainer cogs can be additionally formed on the retainer plate to fit into corresponding openings in the wick strip. The wick strip can be urged resiliently by its own elasticity or by additional spring means against the raceway of the guide rail.

On its end face facing the retainer plate or on its end face facing the carrier plate, the wiper can comprise raised regions in the vicinity of the transfer opening or the lubricant canal, so that said raised regions press into the the wick strip or the cellular body, whereby a valve effect is likewise obtained. This embodiment has the advantage that only a minimal amount of lubricant, as is required, far example, in rolling bearings, is transferred by the wick strip directly to the region of contact with the rolling elements without leakage losses. Further, excess lubricant can be absorbed by the wick strip during return travel and released during forward travel.

A lug formed on the lip of the wiper and constituting the end region of the wiper resting on the raceway of the guide rail further enhances the lubricant collecting action of the wick strip.

According to another proposition, the object of the invention is achieved by the fact that the lubricant canals are configured as grooves which start from an end face of the wiper and are closed by a sealing cap. The lubricant canals therefore have no contact with the outside of the bearing component. Such a sealing cap can have a one-piece or a multipiece configuration. It is possible to make said sealing cap with a U-shaped cross-section so that it can be pressed under slight pre-tension, with the legs of the U ahead, into the lubricant canals which are thus completely sealed. This embodiment has the further advantage that no additional axial design space is required for the sealing cap. To increase sealing efficiency under higher lubricant pressure, an elastic sealing layer of a closed-cell cellular material can be additionally inserted between the carrier plate and the wiper. Examples of embodiment of the invention are represented in the drawings and will be described more closely below.

Figure 2:
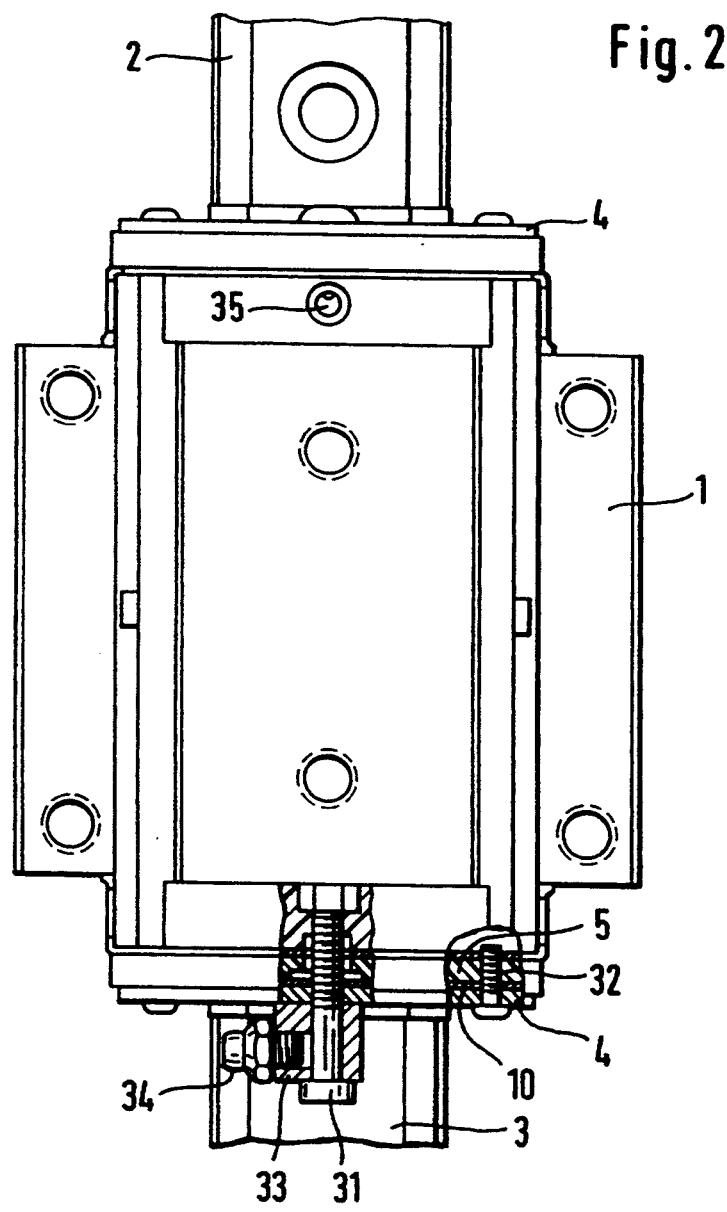
Figure 3:
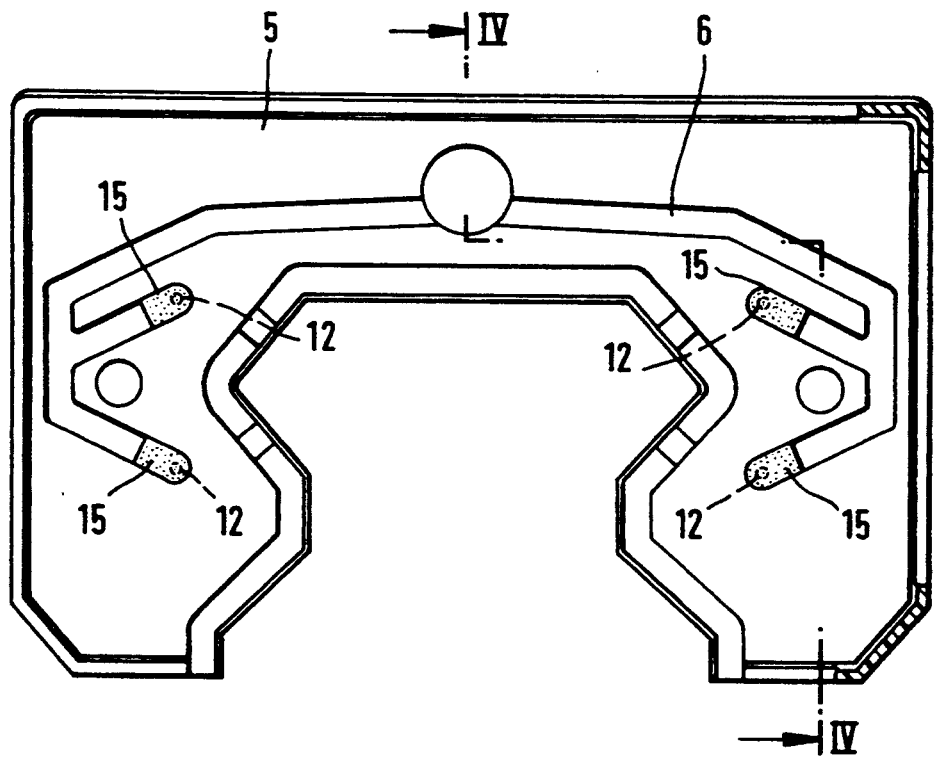
Figure 4:
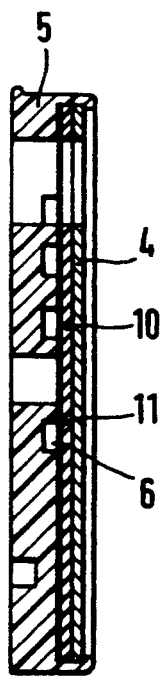
Figure 5:
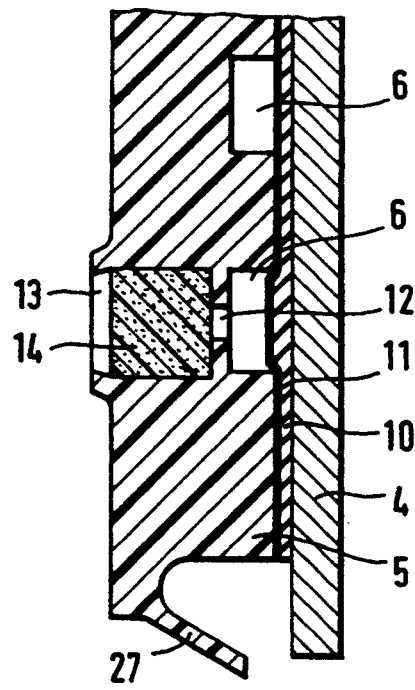
Figure 6:
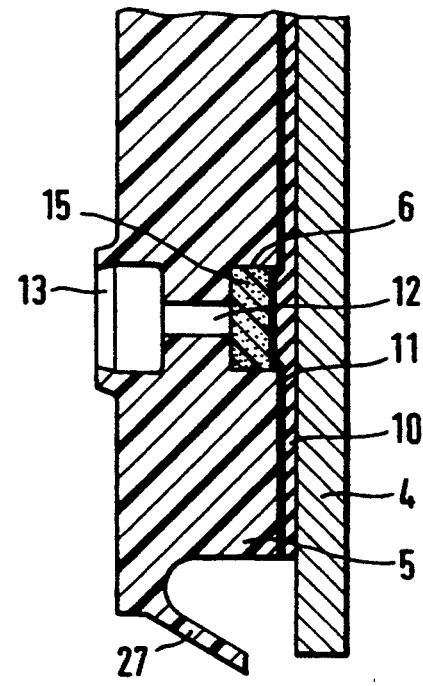

FIG. 1 is a view of a bearing component arranged on a guide rail with a wiper unit on one front end, FIG. 2 is a top view of the bearing component of FIG. 1, FIG. 3 is an end view of a wiper, FIG. 4 is a vertical section of a wiper unit taken along line IV—IV of FIG. 3, FIG. 5 is an enlarged detail of the region of the transfer opening in a wiper unit, FIG. 6 is a detail of the wiper unit modified with respect to the detail of FIG. 5, FIG. 7 is another such detail showing a valve of a material with rubber-like elasticity, FIG. 8 is another such detail showing a non-return valve of a first type, FIG. 9 is another such detail showing a non-return valve of a second type, FIG. 10 is another such detail showing a wick strip, FIG. 11 is an end view of a wiper having a wick strip, FIG. 12 is a top view of the wiper unit of FIG. 11, FIG. 13 is a partial section of the wiper unit comprising a folded wick strip, and FIG. 14 is a view of a sealing cap.

A wiper unit of the invention is mounted on a bearing component 1 in the form of a carriage which surrounds a guide rail 2 in the region of the raceway 3 thereof. At each front end of the bearing component 1, the wiper unit comprises a carrier plate 4 mounted on an end face of a wiper 5. The wiper is made of a polymeric material and comprises lubricant canals 6 in the form of grooves open towards the carrier plate 4.

The grooves can be closed by means of a sealing cap 7 having a U-shaped cross-section and comprising two cap parts 8 and 9. A sealing layer 10 is then disposed on an end face of the wiper 5 and the carrier plate 4 is placed on the sealing layer 10.

In place of the sealing cap 7, the sealing layer 10 alone can be used for sealing the lubricant canal 6 in which case, a tear-resistant foil 11 is additionally arranged between the sealing layer 10 and the wiper 5 and can be glued to the sealing layer 10 in order to prevent a too deep penetration of the sealing layer 10 into the the lubricant canal 6.

At one point, the lubricant canal 6 communicates with the other end face of the wiper facing away from the sealing layer 10 via a connecting canal 12 arranged in the wiper 5 and a transfer opening 13 connected with said canal. Lubricant can thus be transferred from the lubricant canal 6 through the wiper into the interior of the bearing component.

As can be seen in FIG. 5, a body 14 of cellular material is inserted under slight pre-tension into the transfer opening 13 so that due to the capillar action in this open-cell cellular material, no air but only certain amounts of lubricant can flow through the transfer opening 13. According to FIG. 6, such a body 15 of cellular material is inserted into the lubricant canal 6 so as to be directly adjacent to the foil 11.

FIG. 7 shows a wiper 5, in the lubricant canal 6 whereof a valve 16 of a material with rubber-like elasticity is inserted. At its end facing the foil 11, this valve comprises an opening slit 17 which opens only from a certain lubricant pressure on and thus prevents a return-flow of lubricant from the bearing assembly into the lubricant canal 6. According to FIGS. 8 and 9, this purpose is achieved by providing non-return valves 18 and 19 having valve balls 20 wherein the valve body of the non-return valve 18 comprises spring elements 21 which urge the valve ball 20 against a sealing edge 22 of the wiper 5 acting as a valve seat. In FIG. 9, the valve ball 20 of the non-return valve 19 is retained in the closing position by a metal spring 23.

In the wiper unit of FIG. 10 there is provided on the end face of the wiper 5 facing away from the foil 11, a wick strip 24 arranged in a recess 25 of a retainer plate 26 and retained by said retainer plate against the wiper 5. The wick strip 24 projects upto the raceway 3 of the guide rail 2 which it supplies with lubricant from the lubricant canal. In this embodiment, a lug 28 likewise projecting upto the raceway 3 is formed on the wiper lip 27 and, in addition to the wick strip 24, serves to collect lubricant during the travel of the bearing component 1 along the guide rail 2.

According to FIGS. 11, 12 and 13, the wick strips 24 in the recesses 25 of the retainer plate 26 are additionally fixed thereto by projecting retainer cogs 29. In FIG. 13, the wick strip 24 is pressed elastically against the raceway 3 of the guide rail 2 by a spring element 30.

According to FIGS. 1 and 2, the carrier plates z, and the wipers 5 comprise aligned bores through which mounting screws 31 and 32 can be inserted for assembly and screwed into threaded bores of the bearing component 1. In FIG. 2, the screw 31 is longer than the screw 32 so that it simultaneously enables the securing of a lubricating nipple support 33 for a lubricating nipple 34 on the bearing component 1. Lubricant supply can be effected via the lubricant nipple 34 or through bores 35 in the bearing component 1 which start, for example, from the upper surface thereof.

| Reference Numbers |
| --- |
| 1 Bearing component |
| 2 Guide rail |
| 3 Raceway |
| 4 Carrier plate |
| 5 Wiper |
| 6 Lubricant canal |
| 7 Sealing cap |
| 8 Part of sealing cap |
| 9 Part of sealing cap |
| 10 Sealing layer |
| 11 Foil |
| 12 Connecting canal |
| 13 Transfer opening |
| 14 Body of cellular material |
| 15 Body of cellular material |
| 16 Valve |
| 17 Opening slit |
| 18 Non-return valve |
| 19 Non-return valve |
| 20 Valve ball |
| 21 Spring element |
| 22 Sealing edge |
| 23 Metal spring |
| 24 Wick strip |
| 25 Recess |
| 26 Retainer plate |
| 27 Wiper lip |
| 28 Lug |
| 29 Retainer cog |

| Reference Numbers |
| --- |
| 30 Spring element |
| 31 Screw |
| 32 Screw |
| 33 Lubricating nipple support |
| 34 Lubricating nipple |
| 35 Bore |

We claim:

1. A wiper unit for a bearing component, mounted on a raceway of a guide rail and comprising at each front end, a wiper retained by a carrier plate, the wiper being provided with lubricant canals for supplying lubricant to the bearing component, and an end region of the wiper resting on the raceway to retain lubricant in the bearing component, characterized in that the lubricant canals (6) are configured as grooves starting from an end face of the wiper (5), there being arranged between the carrier plate (4) and the wiper (5) an elastic sealing layer (10) provided with a tear-resistant foil (11) which seals the lubricant canals (6).

2. A wiper unit of claim 1 wherein the wiper (5) comprises connecting canals (12) and transfer openings (13) by which the lubricant canals (6) arranged on an outer end face of the wiper (5) are connected with an inner end face thereof facing the bearing component (1).

3. A wiper unit of claim 2 wherein a body (14, 15) of permeable cellular material is inserted into the transfer opening (13) or the lubricant canal (6) and extends through a clear width thereof.

4. A wiper unit of claim 2 wherein the transfer opening (13) is closed by an inserted valve (16) of a material with rubber-like elasticity and having a widenable opening slit (17).

5. A wiper unit of claim 2 wherein the transfer opening (13) is closed in one of two directions of flow by an inserted non-return valve (18, 19).

6. A wiper unit of claim 1 wherein, on the inner end face of the wiper (5) facing the bearing component (1), there is arranged a strip of wick (24) so that an end region of said strip of wick (24) extends upto the raceway (3) of the guide rail (2).

7. A wiper unit of claim 6 wherein the wick strip (24) is retained by a retainer plate (26) and is inserted into a recess (25) of said retainer plate (26).

8. A wiper unit of claim 7 wherein projecting retainer cogs (29) are formed on the retainer plate (26) and fit into corresponding openings in the wick strip (24).

9. A wiper unit according to claim 1 wherein the wick strip (24) is pressed against the raceway (3) of the guide rail (2) by at least one spring element (30).

10. A wiper unit for a bearing component, mounted on a raceway of a guide rail and comprising at each front end, a wiper retained by a carrier plate, the wiper being provided with lubricant canals for supplying lubricant to the bearing component, and an end region of the wiper resting on the raceway to retain lubricant in the bearing component, the lubricant canals (6) being configured as grooves which start from an end face of the wiper (5) and are closed by a sealing cap (7), characterized in that an elastic sealing layer (10) is arranged between the carrier plate (4) and the wiper (5).

* * * * *